Patented Aug. 6, 1940

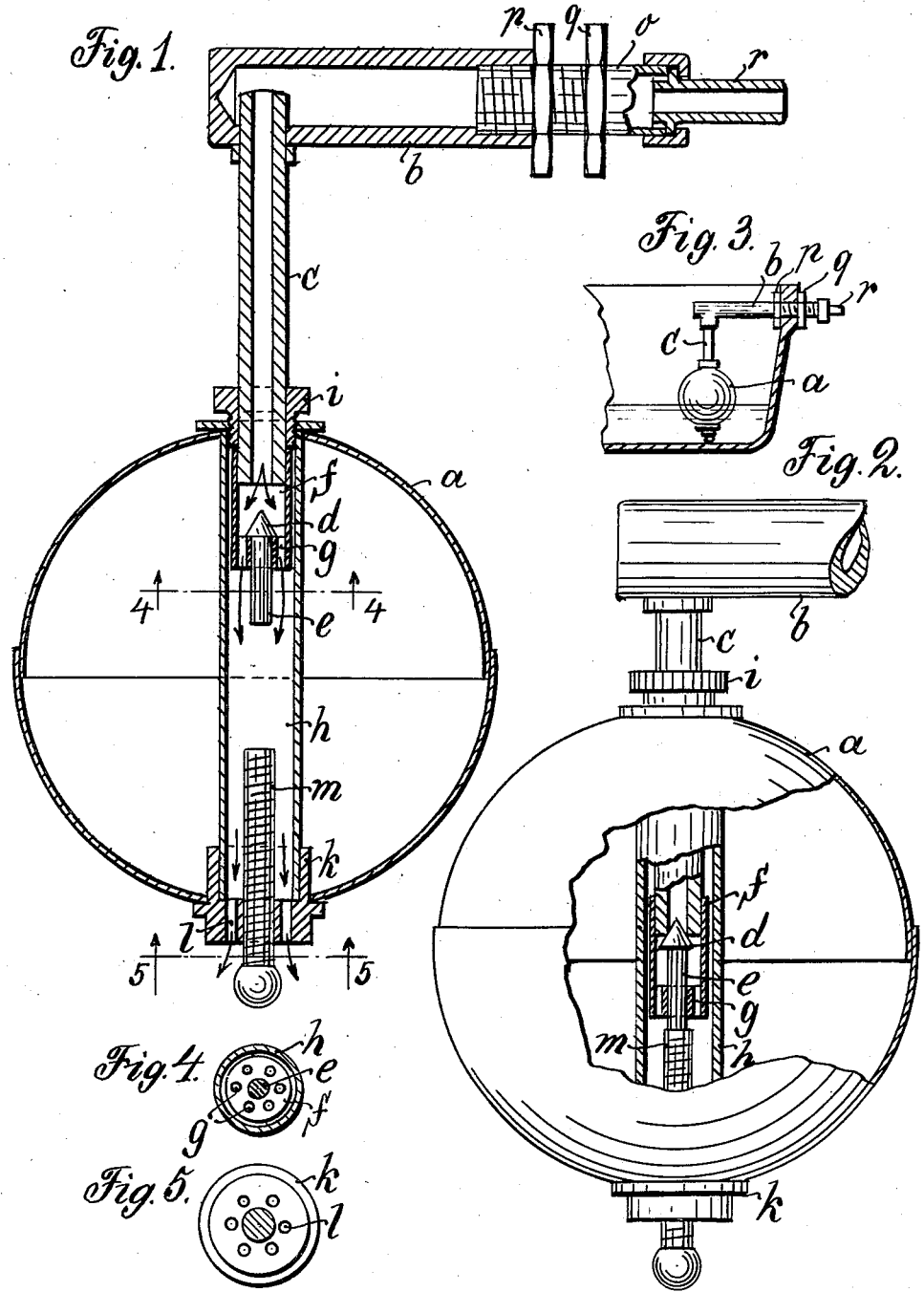

2,210,331

UNITED STATES PATENT OFFICE 2,210,331

FLOAT ACTUATED VALVE MECHANISM

Hermann Bindernagel, Erfurt, Germany

Application January 21, 1938, Serial No. 186,213
In Germany July 27, 1936

2 Claims. (Cl. 137—104)

This invention relates to float operated valves and has particular reference to valves of this character which automatically control the filling of a reservoir, as for example flush tanks.

The primary object of the present invention is to provide a particularly simple and highly efficient float actuated valve mechanism which shall consist of few parts that are inexpensive to manufacture, easy to assemble, and which occupy a relatively small space within the reservoir.

Another object is to provide a float actuated valve mechanism which shall be devoid of all pivoted levers and wherein the valve is actuated directly by the vertical movement of the float.

A further object is to provide a mechanism of the aforesaid character which shall be silent in operation and which shall include adjustable means for varying the height or depth of the liquid in the reservoir.

A still further object is to provide a novel form of float and valve which shall provide positive operation and effective seals without the use of packing glands or similar seals.

With the foregoing and other objects in view, the invention may be stated to consist in the various novel features of construction and arrangement or combination, all of which will be fully described hereinafter and pointed out in the appended claims.

In the drawing accompanying and forming a part of the application

Figure 1 is a vertical sectional view through a float actuated valve mechanism and liquid inlet pipe for a reservoir showing the valve in open position;

Figure 2 is an elevational view with parts broken away and showing the valve in closed position;

Figure 3 is a fragmentary vertical sectional view through a reservoir showing the mechanism in position therein; and Figures 4 and 5 are horizontal sectional views taken respectively on the lines 4—4 and 5—5 of Figure 1.

In the drawing I have illustrated my float actuated valve mechanism for use in connection with the flush tanks of toilets, although it will be understood that it may be used equally well in any reservoir which is adapted to be emptied and filled with a liquid at periodic intervals.

A horizontally disposed liquid intake pipe $b$ is connected at one end with a threaded nipple $o$ which is adapted to extend through the upper side wall of a reservoir $s$ and is clamped thereto in any suitable manner, as by nuts $p$ and $q$ disposed respectively on the inner and outer walls of the reservoir. The opposite end of pipe $b$ is closed, and threaded into a side wall thereof and depending therefrom is a vertically disposed pipe $c$. The lower end of pipe $c$ is fitted with a sleeve $f$ which is provided with a perforated bottom wall forming water passages $g$ and a centrally disposed bore for the reception of a valve stem $e$. The upper end of the valve stem is provided with a conical shaped valve head $d$ which is adapted to engage the inner periphery of the walls of pipe $c$ and thereby close said pipe. In practice, the valve $d$ may be made of any suitable material, although I preferably form the same from Celluloid or similar material which is water-proof and also soft enough to conform to any irregularities of the valve seat and thus provide a liquid tight seal throughout the life of the device.

Slidably mounted on the pipe $c$ is a float $a$ which is preferably spherical in shape and also formed of Celluloid or similar material that is liquid-proof. As shown in Figure 1, a pipe $h$ extends through the vertical axis of the float and the upper end of this pipe is fitted with a bushing $i$ which serves to limit the downward movement of the float by engaging the upper edge portion of the sleeve $f$ as shown in Figure 1. The lower end of pipe $h$ is fitted with sleeve $k$ having a perforated bottom wall, defining water passages $l$, and a centrally disposed threaded bore which receives an adjusting screw $m$.

In use, the structure is installed as a unit in a reservoir by clamping the horizontal nipple $o$ to the upper wall of the reservoir by nuts $p$ and $q$ as shown in Figure 3. The nipple $o$ is connected to a source of water by pipe $r$ in the usual or any approved manner. With the parts as shown in Figure 1, water will flow from supply pipe $r$, through nipple $o$, horizontal pipe $b$, vertical pipe $c$ and past the opened valve $d$, thence through passages $g$, pipe $h$ and passages $l$ into the reservoir. As the liquid level rises in the reservoir, the float $a$ rises along pipe $c$ as a guide, and at a predetermined level, the upper end of adjusting screw $m$ will engage the valve stem $e$ and force the valve $d$ to its seat thereby closing off the supply of water to the reservoir.

It is obvious, that by rotating screw $m$ the time of engagement thereof with valve stem $e$ may be varied and hence the depth of the liquid admitted to the reservoir may also be varied. Once this adjustment is made it may remain fixed.

When the reservoir is emptied, the float $a$ will drop with the liquid level, thereby disengaging screw $m$ with the valve stem $e$ and the pressure of the incoming water will unseat the valve and permit the reservoir to again be filled.

It is a feature of my invention that the water admitted to the reservoir, flows through the plurality of relatively small passages $g$ and $l$. This arrangement serves to silence the flow of the water through the pipes and plumbing system and still permits rapid filling of the reservoir.

By using Celluloid or similar soft and non-deteriorating water-proof material for the valve and float, these parts will last indefinitely and the valve will always seat perfectly on its seat, even if the latter is imperfect. Hence, no packing glands or similar seals are required in my improved structure. The device is extremely compact and easily installed as a unit.

What I claim is:

1. A float actuated valve for toilet reservoirs comprising a vertically disposed inlet pipe the end portion of which forms a valve seat, a float slidably mounted on said pipe, a sleeve carried by the lower end portion of said pipe, said sleeve having a bore and apertures arranged thereabout, a valve including a stem slidably mounted in said bore, said valve in a raised position engaging the valve seat to cut off the flow of liquid into the reservoir, a second sleeve affixed to the float in position beneath the valve stem, an adjustable member supported by the second sleeve and spaced with respect to the valve stem when the liquid in the reservoir is below a predetermined level, said member being adapted to engage the valve stem to lift the valve to the raised position when the liquid in the reservoir reaches said predetermined level, and a series of apertures in said second sleeve arranged about the adjustable member, the first and second named apertures serving to silence the flow of liquid from the inlet pipe to the reservoir.

2. A float actuated valve for toilet reservoirs comprising a vertically disposed inlet pipe the end portion of which forms a valve seat, a float slidably mounted on said pipe, a sleeve carried by the lower end portion of said pipe, said sleeve having a central bore and concentrically arranged apertures, means on said float for engagement with the sleeve to limit sliding movement thereof on the pipe in one direction, a valve including a stem slidably mounted in said bore, said valve in a raised position engaging the valve seat to cut off the flow of liquid into the reservoir, a second sleeve affixed to the float in position beneath the valve stem, an adjustable member centrally supported by the second sleeve and spaced with respect to the valve stem when the liquid in the reservoir is below a predetermined level, said adjustable member being adapted to engage the valve stem to lift the valve to the raised position when the liquid in the reservoir reaches said predetermined level, and a series of apertures in said second sleeve concentrically arranged about the adjustable member, the first and second named apertures serving to silence the flow of liquid from the inlet pipe to the reservoir.

HERMANN BINDERNAGEL.